(12) United States Patent
Goi et al.

(10) Patent No.: US 10,162,136 B2
(45) Date of Patent: Dec. 25, 2018

(54) OPTICAL TRANSMISSION DEVICE AND BIDIRECTIONAL OPTICAL TRANSMISSION DEVICE

(71) Applicant: FUJIKURA LTD., Tokyo (JP)

(72) Inventors: Kazuhiro Goi, Sakura (JP); Katsuhiro Takenaga, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/889,931

(22) Filed: Feb. 6, 2018

(65) Prior Publication Data

US 2018/0224613 A1    Aug. 9, 2018

(30) Foreign Application Priority Data

Feb. 8, 2017  (JP) ................................. 2017-021139

(51) Int. Cl.
| | | |
|---|---|---|
| *G02B 6/28* | (2006.01) | |
| *G02B 6/34* | (2006.01) | |
| *H04B 10/40* | (2013.01) | |
| *G02B 6/42* | (2006.01) | |
| *G02B 6/02* | (2006.01) | |

(52) U.S. Cl.
CPC ....... *G02B 6/4216* (2013.01); *G02B 6/02042* (2013.01); *G02B 6/28* (2013.01); *G02B 6/2804* (2013.01); *G02B 6/34* (2013.01); *G02B 6/4213* (2013.01); *G02B 6/4214* (2013.01); *G02B 6/4246* (2013.01); *H04B 10/40* (2013.01)

(58) Field of Classification Search
CPC .............. G02B 6/02042; G02B 6/2726; G02B 6/2733; G02B 6/2766; G02B 6/2773; G02B 6/2793; G02B 6/28; G02B 6/34; G02B 6/2804; G02B 6/4214; G02B 6/4216; G02B 6/4213; G02B 6/4246; G02B 6/43; H04B 10/40; H04B 10/532
USPC ....... 385/11, 24, 31, 33, 37, 45, 88-92, 100, 385/123, 126; 398/135, 138-139
See application file for complete search history.

(56) References Cited

U.S. PATENT DOCUMENTS 6,975,790 B1 * 12/2005  Jander .................. H04B 10/532
                                                          370/372

FOREIGN PATENT DOCUMENTS

| EP | 3009869 A1 | 4/2016 |
| JP | S62-003205 | 1/1987 |
| WO | 2014/207949 A1 | 12/2014 |

* cited by examiner

*Primary Examiner* — Michael Mooney
(74) *Attorney, Agent, or Firm* — Osha Liang LLP

(57) ABSTRACT

An optical transmission device includes a plurality of transmitting/receiving units provided on a substrate, each transmitting/receiving unit includes: an optical transmitter; an optical receiver; a polarization combiner/splitter; and a connection portion. In the connection portions which are arranged at the positions symmetrical to each other, a direction opposite, with respect to a virtual symmetry axis, to a direction of a main electric field on a plane perpendicular to an emission direction of an optical wave of the connection portion which is emitted from one of the connection portions to an outside is substantially orthogonal to a direction of a main electric field on a plane perpendicular to an emission direction of an optical wave of the connection portion which is emitted from the other of the connection portions to an outside.

7 Claims, 7 Drawing Sheets

OPTICAL TRANSMISSION DEVICE AND BIDIRECTIONAL OPTICAL TRANSMISSION DEVICE

CROSS REFERENCE TO RELATED APPLICATIONS

This application claims priority from Japanese Patent Application No. 2017-021139 filed on Feb. 8, 2017, the contents of which are incorporated herein by reference in their entirety.

BACKGROUND

Field of the Invention

The present invention relates to an optical transmission device and a bidirectional optical transmission device.

Description of the Related Art

Conventionally, a bidirectional optical transmission device such as disclosed by Japanese Unexamined Patent Application, First Publication No. S62-3205 (hereinafter, referred to as Patent Document 1) is known.

The bidirectional optical transmission device provided with a pair of transmitting/receiving units, each of which includes an optical transmitter, an optical receiver, and a polarization combiner/splitter.

The optical transmitter emits an optical wave having a polarization state.

The optical receiver can receive an optical wave having a polarization state.

The polarization combiner/splitter can split and combine an optical wave having a different polarization state and is connected to the optical transmitter and the optical receiver.

The transmitting/receiving units which form one pair are connected to each other via a polarization-maintaining optical fiber.

In the disclosure of the above bidirectional optical transmission device, the directions of electric fields on planes of two optical waves which bidirectionally pass through the inside of one polarization-maintaining optical fiber are orthogonal to each other.

Additionally, in order to cause the directions of the electric fields on planes of the two optical waves which pass through the inside of one polarization-maintaining optical fiber as mentioned above to be orthogonal to each other, one of the optical transmitters and the other of the optical transmitters emit optical waves whose electric fields on planes are orthogonal to each other.

As a result of adopting the foregoing configuration, it is possible to reduce polarization crosstalk of the above-mentioned two optical waves.

In the configuration of the aforementioned Patent Document 1, a polarization state of the optical wave emitted from one of the optical transmitters is different from a polarization state of the optical wave emitted from the other of the optical transmitters.

Because of this, for a planar optical waveguide device that includes one of the optical transmitters and a planar optical waveguide device that includes the other of the optical transmitters, it is necessary to prepare different kinds of planar optical waveguide devices.

In the above-described manner, in the case of using a pair of two planar optical waveguide devices which are different from each other, the cost of manufacturing a bidirectional optical transmission device increases or ease of maintenance is deteriorated.

Furthermore, in this kind of bidirectional optical transmission device, there is a demand that it is possible to achieve larger capacity optical transmission by using a planar optical waveguide device including a substrate on which a plurality of transmitting/receiving units are arranged.

In this case, a pair of planar optical waveguide devices, each of which includes a substrate on which a plurality of transmitting/receiving units are arranged in parallel, may be used, and the transmitting/receiving units corresponding thereto may be connected each other via a polarization-maintaining optical fiber.

In the case where a plurality of transmitting/receiving units are provided, it is conceivable that transmission is carried out in the same polarization-maintaining optical fiber by using two modes.

In contrast, in the case where two modes are used for transmission and reception, it is possible to reduce an effect of polarization crosstalk between two modes.

However, in the case of carrying out transmission and reception inside one polarization-maintaining optical fiber described above, for example, in the case of adopting a configuration in which an optical wave having horizontal electric field (transverse-electric, TE) mode is output from each optical transmitter of one of the planar optical waveguide devices, each optical receiver of the other of the planar optical waveguide devices which corresponds thereto is configured to able to receive an optical wave having TE mode.

For this reason, in order to reduce polarization crosstalk, the configuration is necessary so that an optical wave having a transverse magnetic field (transverse-magnetic, TM) mode orthogonal to TE mode in the electric field on a plane is output from each optical transmitter of the other of the planar optical waveguide devices.

Accordingly, also in this case, it is necessary to prepare two planar optical waveguide devices which are different from each other, not only the manufacturing cost increases but also flexibility of maintenance or modification of wiring is limited.

SUMMARY

One or more embodiments of the invention achieve a common configuration as configurations of a plurality of transmitting/receiving units provided on a pair of substrates while reducing polarization crosstalk by carrying out light transmission and light reception in one polarization-maintaining fiber.

In one or more embodiments of the invention, an optical transmission device includes: a plurality of transmitting/receiving units provided on a substrate, each transmitting/receiving unit comprising: an optical transmitter that is capable of emitting an optical wave having a polarization state; an optical receiver; a polarization combiner/splitter that is connected to the optical transmitter and the optical receiver and is capable of splitting and combining an optical wave having a different polarization state; and a connection portion that is connected to the polarization combiner/splitter and is connectable to one end of a polarization-maintaining optical fiber. The connection portions of the plurality of the transmitting/receiving units are arranged on the substrate parallel to each other in a first direction, the connection portions which form at least one pair thereof are arranged at positions symmetrical to a virtual symmetry axis extending in a direction perpendicular to the first direction. In the connection portions arranged at positions symmetrical to each other, a direction opposite, with respect to the virtual symmetry axis, to a direction of a main electric field on a plane perpendicular to an emission direction of an optical wave of the connection portion which is emitted from one of the connection portions to an outside a direction of a main electric field on a plane perpendicular to an emission direction of an optical wave of the connection portion which is emitted from the other of the connection portions to an outside are substantially orthogonal to each other.

In the optical transmission device according to one or more embodiments, in the plurality of transmitting/receiving units which are arranged at the positions symmetrical to the virtual symmetry axis extending perpendicularly to the first direction, a direction opposite, with respect to the virtual symmetry axis, to a direction of a main electric field on a plane perpendicular to an emission direction of an optical wave of the connection portion which is emitted from one of the connection portions to an outside and a direction of a main electric field on a plane perpendicular to an emission direction of an optical wave of the connection portion which is emitted from the other of the connection portions to an outside are substantially orthogonal to each other.

As a result, according to one or more embodiments, a pair of connection portions are connected to each other via a polarization-maintaining optical fiber, that is, the connection portion of the aforementioned optical transmission device is connected to the connection portion of the optical transmission device having the same configuration as that of at least the above-described plurality of the transmitting/receiving units, via a polarization-maintaining optical fiber. When the bidirectional optical transmission device is configured by the connection portions, it is possible to achieve a common configuration as the configurations of at least the plurality of the transmitting/receiving units in the pair of the optical transmission devices while reducing polarization crosstalk between the optical waves that bidirectionally propagate the inside of the polarization-maintaining optical fiber.

Furthermore, in the optical transmission device according to one or more embodiments, in the transmitting/receiving unit in which the connection portions are adjacent to each other in the plurality of the transmitting/receiving units, a direction opposite, with respect to the virtual symmetry axis, to a direction of a main electric field on a plane perpendicular to an emission direction of an optical wave of the connection portion which is emitted from one of the connection portions to an outside and a direction of a main electric field on a plane perpendicular to an emission direction of an optical wave of the connection portion which is emitted from the other of the connection portions to an outside may be substantially orthogonal to each other.

According to one or more embodiments, since the directions of the main electric fields are each substantially orthogonal to each other in the connection portions adjacent to each other, the directions of the main electric fields of the optical waves are substantially orthogonal to each other which propagate in the same direction in the insides of the polarization-maintaining optical fibers adjacent to each other, it is possible to reduce polarization crosstalk.

Moreover, according to one or more embodiments, the transmitting/receiving unit may further include a polarization rotator that is arranged at least one of: between the optical receiver and the polarization combiner/splitter; and between the optical transmitter and the polarization combiner/splitter and is capable of rotating an electric field at 90 degrees on a plane perpendicular to a propagating direction of an optical wave.

According to one or more embodiments, for example, when the optical wave directed from the polarization combiner/splitter toward the optical receiver is TM mode in the case of using an optical receiver having a higher degree of efficiency of receiving a TE-mode optical wave than a TM-mode optical wave, as the polarization rotator converts an electric field on a plane having TM mode which is rotated at 90 degrees into TE mode and thereafter causes the optical receiver to receive the optical wave having the mode, it is possible to improve the light receiving efficiency of the optical receiver.

Additionally, according to one or more embodiments, in the optical transmitter, a modulator having a high degree of efficiency in, for example, TE mode is used. Therefore, by designing all modulators or all Laser Diodes (LD) which are provided at transmission side to use the same polarization in advance, the polarization rotator can only rotate a transmitting/receiving section which is desirable to output an optical wave having TM mode.

Moreover, according to one or more embodiments, the connection portions adjacent to each other in the plurality of the transmitting/receiving units are arranged on the substrate at equal distance.

According to one or more embodiments, for example, when connecting the polarization-maintaining optical fibers to a pair of optical transmission devices after bundling the portions other than the both ends of each of the polarization-maintaining optical fibers, since the connection portions are arranged on the substrate at regular intervals, distances between adjacent optical fibers of the polarization-maintaining optical fibers can be equal to each other at one of the both ends of the bundle of the polarization-maintaining optical fibers.

According to one or more embodiments, each polarization-maintaining optical fiber can be easily connected to an optical transmission device at at least one of the both ends of the bundle of the polarization-maintaining optical fibers, and it is possible to improve workability when installation of an optical transmission device.

According to one or more embodiments, the connection portions of the plurality of the transmitting/receiving units may be also arranged on the substrate in a second direction perpendicular to the first direction.

According to one or more embodiments, since the transmitting/receiving units are arranged on the substrate in two directions, a larger number of transmitting/receiving units can be disposed on the substrate, and it is possible to provide an optical transmission device that can achieve a larger amount of communication.

According to one or more embodiments, a bidirectional optical transmission device is configured so that the connection portion of the optical transmission device and the connection portion of an optical transmission device having the same configuration as that of at least a plurality of the transmitting/receiving units of the optical transmission device, which form a pair of connection portions, are connected to each other via the polarization-maintaining optical fiber.

According to one or more embodiments, in the bidirectional optical transmission device, in the plurality of transmitting/receiving units which are arranged at the positions symmetrical to the virtual symmetry axis extending perpendicularly to the first direction, a direction opposite, with respect to the virtual symmetry axis, to a direction of a main electric field on a plane perpendicular to an emission direction of an optical wave of the connection portion which is emitted from one of the connection portions to an outside and a direction of a main electric field on a plane perpendicular to an emission direction of an optical wave of the connection portion which is emitted from the other of the connection portions to an outside are substantially orthogonal to each other.

Consequently, according to one or more embodiments, it is possible to achieve a common configuration as the configurations of at least the plurality of the transmitting/receiving units in the pair of the optical transmission devices while reducing polarization crosstalk between the optical waves that bidirectionally propagate the inside of the polarization-maintaining optical fiber.

According to one or more embodiment, the bidirectional optical transmission device may further include a polarization-maintaining multi-core optical fiber that is connected to the optical transmission device and has a plurality of cores.

According to one or more embodiments, by connecting the optical transmission devices to each other by use of polarization-maintaining multi-core optical fiber, it is possible to achieve the optical transmission devices with a relatively simple configuration.

According to one or more embodiments, a common configuration is achieved as the configurations of at least the plurality of the transmitting/receiving units in the pair of the optical transmission devices while reducing polarization crosstalk.

DETAILED DESCRIPTION

A configuration of a bidirectional optical transmission device according to one or more embodiments will be described with reference to FIG. 1.

Figure 1:
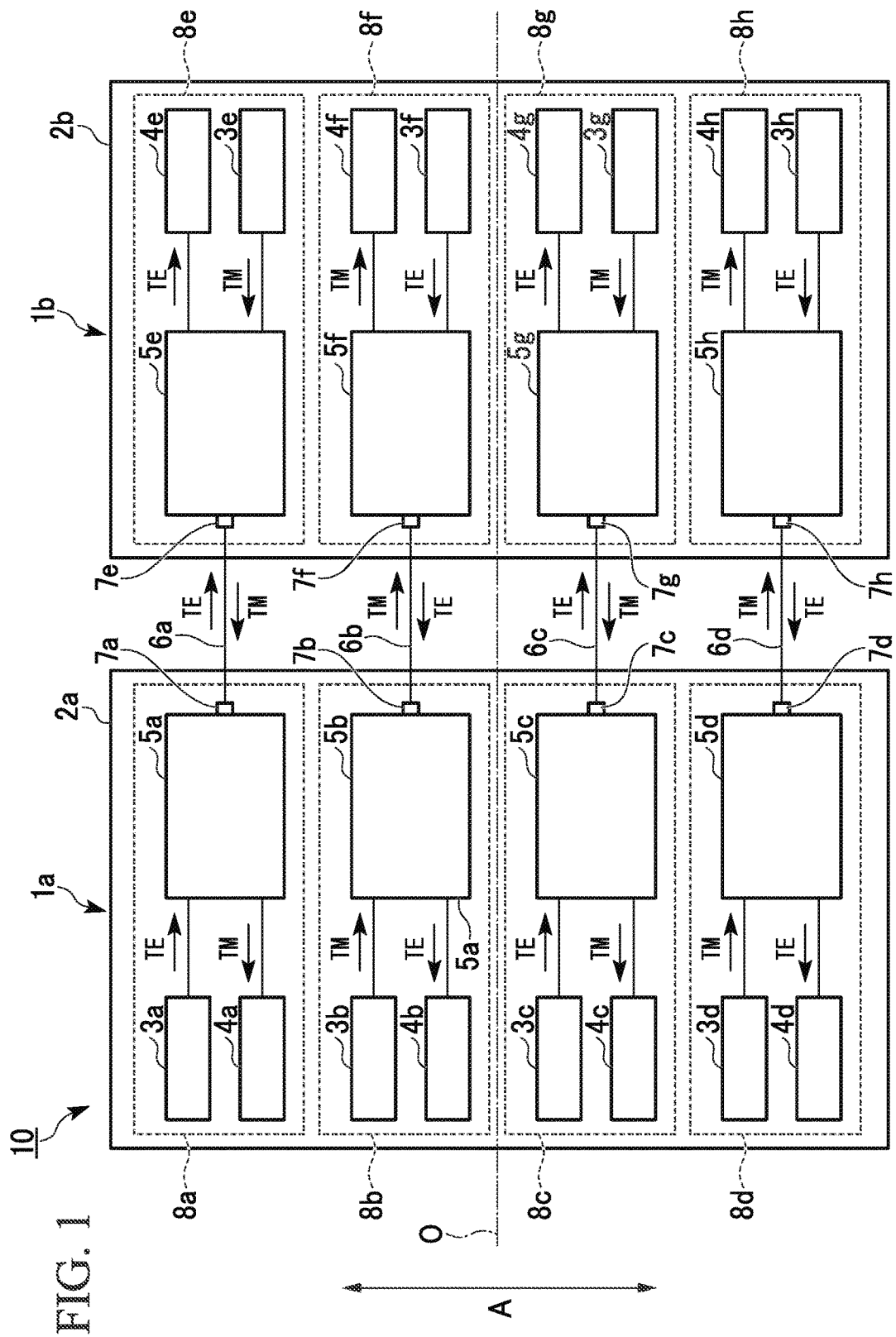
FIG. 1 is a diagram showing a configuration of an optical transmission device according to one or more embodiments.

As shown in FIG. 1, a bidirectional optical transmission device 10 includes: optical transmission devices 1a and 1b; and a plurality of polarization-maintaining optical fibers 6a to 6d.

As shown in FIG. 1, the optical transmission device 1a includes: a substrate 2a; and transmitting/receiving units 8a to 8d arranged on the substrate 2a.

The transmitting/receiving units 8a to 8d are arranged on the substrate 2a in parallel to the first direction A.

The optical transmission device 1b includes: a substrate 2b; and transmitting/receiving units 8e to 8h arranged on the substrate 2b.

The transmitting/receiving units 8e to 8h are arranged on the substrate 2b in parallel to the first direction A.

The bidirectional optical transmission device 10 includes: optical transmitters 3a to 3h, optical receivers 4a to 4h, polarization combiners/splitters 5a to 5h, and connection portions 7a to 7h. Each of the transmitting/receiving units 8a to 8h includes: an optical transmitter; an optical receiver; a polarization combiner/splitter; and a connection portion. Particularly, the transmitting/receiving unit 8a includes: the optical transmitter 3a; the optical receiver 4a; the polarization combiner/splitter 5a; and the connection portion 7a. The transmitting/receiving unit 8b includes: the optical transmitter 3b; the optical receiver 4b; the polarization combiner/splitter 5b; and the connection portion 7b. The transmitting/receiving unit 8c includes: the optical transmitter 3c; the optical receiver 4c; the polarization combiner/splitter 5c; and the connection portion 7c. The transmitting/receiving unit 8d includes: the optical transmitter 3d; the optical receiver 4d; the polarization combiner/splitter 5d; and the connection portion 7d. The transmitting/receiving unit 8e includes: the optical transmitter 3e; the optical receiver 4e; the polarization combiner/splitter 5e; and the connection portion 7e. The transmitting/receiving unit 8f includes: the optical transmitter 3f; the optical receiver 4f; the polarization combiner/splitter 5f; and the connection portion 7f. The transmitting/receiving unit 8g includes: the optical transmitter 3g; the optical receiver 4g; the polarization combiner/splitter 5g; and the connection portion 7g. The transmitting/receiving unit 8h includes: the optical transmitter 3h; the optical receiver 4h; the polarization combiner/splitter 5h; and the connection portion 7h.

According to one or more embodiments, the first direction A linearly extends.

As the optical transmission devices 1a and 1b, for example, a device using a Silicon on Insulator (SOI) substrate is adopted.

Moreover, an optical waveguide may be formed on an indium-phosphorus (InP) substrate.

In the case where an SOI substrate is used as the optical transmission devices 1a and 1b, the substrates 2a and 2b are used which are formed of undoped Si and has a flat surface.

On the substrates 2a and 2b, a Si waveguide can be formed which is configured to include: a lower cladding serving as a Buried Oxide (BOX) layer that has a thickness of, for example, approximately 3 μm, is not shown in the figure and is made of $SiO_2$; a Si core that is provided above the lower cladding and is formed of an SOI-layer; and an upper cladding that is provide above, for example, the SOI-layer and is formed of $SiO_2$.

The Si waveguide configures various components, elements, or devices, such as a directional coupler including a rectangular waveguide and a rib waveguide as a basic structure. The various components, elements, or devices are connected to each other on the substrates 2a and 2b.

Accordingly, it is possible to form an integrated device on one chip (one device).

Here, both the substrates 2a and 2b use the same substrate as each other; however, the invention is not limited to this, the substrates 2a and 2b may use the substrate different from each other.

The optical transmitters 3a to 3d are mounted on the substrate 2a.

The optical transmitters 3e to 3h are mounted on the substrate 2b.

As the optical transmitters 3a to 3h, for example, a Laser Diode (LD) formed of indium-phosphorus (InP) based material can be used.

By use of an InP-based LD as the optical transmitters 3a to 3h, silicon having an indirect transition bandgap and forming a non-emission device is used as a waveguide, and optical components which are necessary to transmit and receive light can be also integrated into one chip.

The optical transmitters 3a to 3h emit polarized optical wave.

In the example shown in FIG. 1, the optical transmitters 3a, 3c, 3f, and 3h emit optical wave having TE mode, and the optical transmitters 3b, 3d, 3e, 3g emit optical wave having TM mode.

The direction of the electric field on a plane of the optical wave having TE mode is parallel to the flat surfaces of the substrates 2a and 2b, and the direction of the electric field on a plane of the optical wave having TM mode is perpendicular to the substrates 2a and 2b.

Furthermore, in the case of using an LD as the optical transmitters 3a to 3h, a mode converter can be used as the connection portion between the LD and the optical waveguide in order to correspond to a large mode field diameter of the LD.

As a result, it is possible to reduce a loss.

Note that, the optical transmitters 3a to 3h do not necessarily have to be mounted on the substrates 2a and 2b, for example, light may be input to the substrates 2a and 2b from the LD by providing an LD outside the substrates 2a and 2b.

In this case, input ends arranged on the substrates 2a and 2b can be regarded as the optical transmitters 3a to 3h.

Note that, in the case where an LD is arranged outside the optical transmission device 1a in terms of commonalization, the optical transmission device 1b may be configured so that an LD is also arranged outside the optical transmission device.

Here, TE mode of the invention means the mode whose main electric field on a plane of TE mode in the optical transmission devices 1a and 1b is horizontal to the substrates 2a and 2b.

Additionally, TM mode in accordance with one or more embodiments means the mode whose main electric field on a plane of TM mode in the optical transmission devices 1a and 1b is perpendicular to the substrates 2a and 2b.

Particularly, the aforementioned TE mode strictly means the mode whose electric field is present only in the vertical direction with respect to the light traveling direction, and strict TE mode is not obtained in the optical transmission devices 1a and 1b; however, this is also defined as TE mode according to one or more embodiments.

Regarding connection between the optical transmission devices 1a and 1b and the polarization-maintaining optical fibers 6a to 6d, when the connection is carried out so that the direction of the main electric field on the plane perpendicular to the waveguide direction of the optical wave having TE mode at substrate side matches an intentional direction of the slow axis or the fast axis of the polarization-maintaining fiber, the optical transmission devices may be connected to the polarization-maintaining optical fibers at 0 degree; however, the angle is not limited to 0 degree, displacement between the optical transmission device and the polarization-maintaining optical fiber may occur within the range where the optical transmission device 10 functions normally.

In this case, each polarization-maintaining optical fiber may be connected to the polarization combiner/splitter corresponding thereto at the angle being specifically in a range of −10 degrees to +10 degrees.

Note that, in one or more embodiments, the term "substantially orthogonal" means the range where the optical transmission devices 1a and 1b functions normally as TE mode or TM mode when an optical wave is transmitted to the inside of the optical transmission devices.

That is, the term "substantially orthogonal" is not the conceptional term strictly representing 90 degrees, and it is only necessary that the meaning of this term is an angle of, for example, 90 degrees±10 degrees.

Moreover, in the case of converting data into light, modulators (not shown in the figure) may be direct provided to the optical transmitters 3a to 3h or provided between the optical transmitters 3a to 3h and the polarization combiners/splitters 5a to 5h.

In this case, a modulator mountable on the substrates 2a and 2b can be used as a modulator such as ring resonator or Mach-Zehnder optical modulator.

Particularly, modulation utilizing a carrier plasma effect is adopted as modulation appropriate to high speed operation.

In this case, by utilizing semiconductor made of Si, a p-n junction is formed by ion implantation, concentration of carrier varies by applying a voltage thereto, and therefore it is possible to modulate the phase of light that propagates through the modulator.

Generally, the above-described modulator is designed so as to correspond to one of the waveguide modes having two polarized lights which are substantially orthogonal to each other of waveguides, and therefore it is necessary to modify the design of the modulator in order to correspond to various planes of polarization.

As the optical receivers 4a to 4h, for example, a photo detector (PD) can be used.

Also, a GePD may be used in which germanium (Ge) is grown on the substrates 2a and 2b.

The PD has the configuration that can receive both polarized waves at the same time. However, generally, the PD has the characteristics different from each other regarding the polarized waves. Therefore, the PD may be designed depending on each polarized wave in consideration of characteristics, for example, maximizing reception sensitivity.

The optical receivers 4a to 4d are mounted on the substrate 2a, and the optical receivers 4e to 4h are mounted on the substrate 2b.

In other cases, the optical receivers 4a and 4b may be mounted on the outer side of the substrates 2a and 2b without being mounted on the substrates 2a and 2b. In this case, it is also possible to receive light at the outside of the substrates 2a and 2b.

In this case, an output end on the substrate from which an optical signal is output to the outside can be regarded as an optical receiver.

The polarization combiners/splitters 5a to 5h can split and combine an optical wave having a different polarization state.

The polarization combiner/splitter 5a is connected to the optical transmitter 3a and the optical receiver 4a via through optical waveguides.

Similarly, the polarization combiner/splitter 5b is connected to the optical transmitter 3b and the optical receiver 4b via through optical waveguides, the polarization combiner/splitter 5c is connected to the optical transmitter 3c and the optical receiver 4c via through optical waveguides, the polarization combiner/splitter 5d is connected to the optical transmitter 3d and the optical receiver 4d via through optical waveguides, the polarization combiner/splitter 5e is connected to the optical transmitter 3e and the optical receiver 4e via through optical waveguides, the polarization combiner/splitter 5f is connected to the optical transmitter 3f and the optical receiver 4f via through optical waveguides, the polarization combiner/splitter 5g is connected to the optical transmitter 3g and the optical receiver 4g via through optical waveguides, and the polarization combiner/splitter 5h is connected to the optical transmitter 3h and the optical receiver 4h via through optical waveguides.

As the polarization combiners/splitters 5a to 5h, for example, a directional coupler can be used.

The directional coupler utilizes a difference in effective refractive index between TE mode and TM mode of waveguides, has a different beat length, and can selectively carry out transition of only one of polarized waves.

Figure 2:
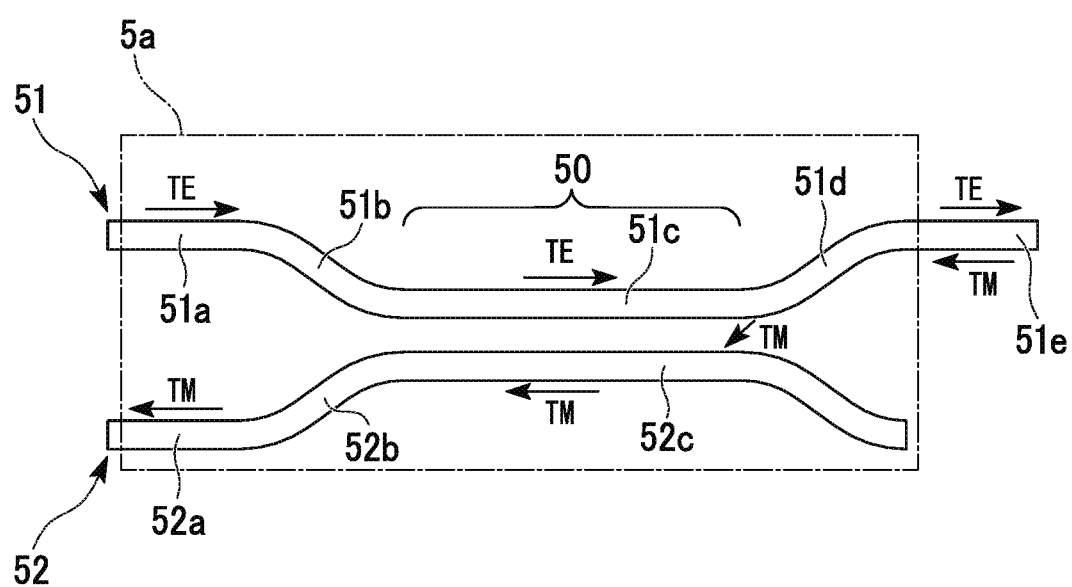
FIG. 2 is a diagram showing a configuration of a polarization combiner/splitter shown in FIG. 1.

FIG. 2 is a conceptual diagram showing a case of using a directional coupler 50 in the polarization combiner/splitter 5a.

Note that, the configurations of the polarization combiners/splitters 5b to 5h are the same as the configuration shown in FIG. 2.

As shown in FIG. 2, the polarization combiner/splitter 5a includes optical waveguides 51 and 52.

The optical waveguide 51 includes a first port 51a, a curved waveguide 51b, a linear waveguide 51c, a curved waveguide 51d, and a third port 51e.

The optical waveguide 52 includes a second port 52a, a curved waveguide 52b, and a linear waveguide 52c.

In the directional coupler 50, a silicon waveguide formed in a rectangular shape can be continuously connected to various waveguides without a discontinuous cross-sectional surface.

The first port 51a is connected to the optical transmitter 3a.

The second port 52a is connected to the optical receiver 4a.

The third port 51e is connected to the connection portion 7a (refer to FIG. 1).

The optical waveguides 51 and 52 extend from the first port 51a and the second port 52a toward the linear waveguide 51c and the linear waveguide 52c, respectively, and are curved so as to smoothly come close to each other by the curved waveguides 51b and 52b.

The linear waveguide 51c and the linear waveguide 52c are arranged in parallel to each other at a predetermined distance that can selectively carry out transition of light and form the directional coupler 50.

The optical waveguide 51 is curved by the curved waveguide 51d in the direction such that the optical waveguide is smoothly separated from the optical waveguide 52 and to be near the third port 51e and is connected to the polarization-maintaining optical fiber 6.

On the other hand, the optical waveguide 52 is curved in the direction such that the optical waveguide is smoothly separated from the optical waveguide 51 and is terminated.

An optical wave having TE mode emitted from the optical transmitter 3a is launched into the first port 51a.

The optical wave having TE mode launched into the first port 51a passes through the curved waveguide 51b and enters the polarization-maintaining optical fiber 6a through the linear waveguide 51c, the curved waveguide 51d, the third port 51e, and the connection portion 7a without carrying out transition to the optical waveguide 52.

In contrast, an optical wave having TM mode which travels in the polarization-maintaining optical fiber 6a in the direction opposite to the traveling direction of an optical wave having TE mode is launched into the third port 51e.

The optical wave having TM mode launched into the third port 51e passes through the curved waveguide 51d and carries out transition from the linear waveguide 51c to the linear waveguide 52c in the directional coupler 50.

The optical wave having TM mode that carries out transition to the linear waveguide 52c enters the curved waveguide 52b.

The optical wave having TM mode which enters the curved waveguide 52b is launched into the optical receiver 4a through the second port 52a.

That is, in the optical waveguide 51, optical waves having two types of modes, that is, TM mode and TE mode coexist between the third port 51e and the middle of the linear waveguide 51c.

In other cases, a mode converter (not shown in the figure) that is used to adjust a mode field diameter may be arranged between the third port 51e and polarization-maintaining optical fiber 6a.

Particularly, in the case of an optical waveguide, since TE mode has a higher effective refractive index, the transition from TM mode to the other mode is easily carried out.

Because of this, in the configuration shown in FIG. 2, an optical wave having TM mode which propagates through the optical waveguide 51 carries out transition to the optical waveguide 52.

However, a directional coupler is not limited to the configuration shown in FIG. 2 and can be designed depending on the types of an optical transmitter and an optical receiver which are used therein.

For example, the configuration may be adopted in which an optical wave having TE mode which propagates through the optical waveguide 51 carries out transition to the optical waveguide 52 by adjusting the conditions of the effective refractive index.

In this case, the configuration is adopted in which an optical wave having TE mode is launched into the third port 51e and propagates through the optical waveguide 51.

Additionally, each of the optical waveguides 51 and 52 has curved waveguide in FIG. 2; however, the directional coupler 50 may be configured so that a curved waveguide is provided only at one of the optical waveguides 51 and 52.

As shown in FIG. 1, the polarization combiners/splitters 5a to 5h are connected to the connection portions 7a to 7h, respectively.

One of ends of the polarization-maintaining optical fibers 6a to 6d is connected to the connection portions 7a to 7h, respectively.

The connection portions 7a to 7h are arranged in the first direction A at equal distance.

Here, in focusing on a mode of the optical wave emitted from the optical transmitters 3a to 3h, in the optical transmission device 1a, the optical transmitters 3a and 3c emit an optical wave having TE mode, and the optical transmitters 3b and 3d emit an optical wave having TM mode.

Similarly, in the optical transmission device 1b, the optical transmitters 3f and 3h emit an optical wave having TE mode, and the optical transmitters 3e and 3g emit an optical wave having TM mode.

As mentioned above, the arrangement and the mode of the emitting optical wave of the optical transmitters of the optical transmission device 1b coincide with the arrangement and the mode of the emitting optical wave of the optical transmitters of the optical transmission device 1a.

Furthermore, in focusing on a mode of the optical wave emitted from the optical receivers 4a to 4h, in the optical transmission device 1a, an optical wave having TM mode is launched into the optical receivers 4a and 4c, and an optical wave having TE mode is launched into the optical receivers 4b and 4d.

Similarly, in the optical transmission device 1b, an optical wave having TM mode is launched into the optical receivers 4f and 4h, and an optical wave having TE mode is launched into the optical receivers 4e and 4g.

As mentioned above, the arrangement and the mode of the optical wave of the optical receivers of the optical transmission device 1b coincide with the arrangement and the mode of the emitting optical wave of the optical transmitters of the optical transmission device 1a.

Consequently, it is possible to achieve a common configuration as the configurations of a plurality of transmitting/receiving units on the substrate.

In addition, in the case of using the same substrate as the substrate 2a and 2b, it is also possible to achieve a common device as the optical transmission devices 1a and 1b.

Furthermore, since the propagation directions of two modes propagating through each polarization-maintaining optical fibers 6a to 6d are directions reversed to each other, it is possible to reduce polarization crosstalk in a single core.

Next, conditions to achieve a common configuration as the configurations of a plurality of transmitting/receiving units on the substrate while reducing polarization crosstalk as described above will be described.

The case is considered where the optical transmission devices 1a and 1b are arranged so that the polarization combiners/splitters of the optical transmission devices 1a and 1b face each other and transmitting/receiving units facing each other are connected to each other by the polarization-maintaining optical fiber as shown in FIG. 1.

In this case, the transmitting/receiving units 8a and 8e form a pair and work.

Regarding the conditions to achieve a common configuration as the configurations of a plurality of transmitting/receiving units on the substrate while carrying out transmission and reception of light by use of an optical fiber having one core, firstly, it is necessary that, in the waveguide in which an optical wave emitted from an optical transmitter and an optical wave launched into an optical receiver coexist, the directions of the main electric fields on the plane perpendicular to the waveguide directions of the optical waves are substantially orthogonal to each other, that is, the above-described optical waves are optical waves having polarization modes different from each other.

Consequently, in the configurations of the transmitting/receiving units according to one or more embodiments, the directions of the main electric fields on the plane perpendicular to the emission directions of the optical waves emitted from the optical transmitters 3a and 3e of the transmitting/receiving units which form a pair are substantially orthogonal to each other.

Moreover, in the configurations of the transmitting/receiving units according to one or more embodiments, the directions of the main electric fields on the plane perpendicular to the waveguide directions of the optical waves launched into the optical receivers 4a and 4e of the transmitting/receiving units which form a pair are substantially orthogonal to each other.

Similarly, the transmitting/receiving units 8b and 8f form a pair and work, the transmitting/receiving units 8c and 8g form a pair and work, and the transmitting/receiving units 8d and 8h form a pair and work. In the configurations of the transmitting/receiving units according to one or more embodiments, in the waveguide in which an optical wave emitted from an optical transmitter and an optical wave launched into an optical receiver coexist, the directions of the main electric fields on the plane perpendicular to the waveguide directions of the optical waves are substantially orthogonal to each other.

Furthermore, in order to achieve a common configuration as the configurations of a plurality of transmitting/receiving units on the substrate, in a pair of connection portions arranged at the positions symmetrical to each other in one optical transmission device, the configuration is necessary in which a direction (reverse direction) opposite, with respect to the virtual symmetry axis O, to the direction of the main electric field on the plane perpendicular to the emission direction of the optical wave of the connection portion which is emitted from one of the connection portions (first connection portion) to the outside and a direction (electric field direction) of the main electric field on a plane perpendicular to the emission direction of the optical wave of the connection portion which is emitted from the other of connection portions (second connection portion) to the outside are substantially orthogonal to each other.

In FIG. 1, in the optical transmission device 1a, the connection portion 7b of the transmitting/receiving unit 8b and the connection portion 7c of the transmitting/receiving unit 8c are arranged at the positions symmetrical to each other with respect to the virtual symmetry axis O.

Particularly, the directions of the main electric fields on the plane perpendicular to the emission directions of the optical waves emitted from the optical transmitters 3b and 3c of the transmitting/receiving units 8b and 8c are substantially orthogonal to each other.

Additionally, the directions of the main electric fields on the plane perpendicular to the incident directions of the optical waves launched into the optical receivers 4b and 4c of the transmitting/receiving units 8b and 8c, respectively, are also substantially orthogonal to each other.

Similar to the transmitting/receiving units 8b and 8c, the connection portions 7a and 7d of the transmitting/receiving units 8a and 8d are arranged at the positions symmetrical to each other with respect to the virtual symmetry axis O.

Also, the direction of the main electric field on the plane perpendicular to the emission directions of the optical waves emitted from the optical transmitters 3a and 3d are also substantially orthogonal to each other.

In addition, the directions of the main electric fields on the plane perpendicular to the incident directions of the optical waves launched into the optical receivers 4a and 4d are also substantially orthogonal to each other.

Consequently, for example, in the case of explaining an optical wave that can exist near the optical transmission device 1a, the direction opposite, with respect to the virtual symmetry axis O, to the direction of the main electric field on the plane perpendicular to the emission direction at the connection portion 7b of the optical wave emitted from the connection portion 7b to the outside (polarization-maintaining optical fiber 6b) and the direction of the main electric field on the plane perpendicular to the emission direction at the connection portion 7c of the optical wave emitted from the connection portion 7c to the outside (polarization-maintaining optical fiber 6c) are substantially orthogonal to each other.

Furthermore, the direction opposite, with respect to the virtual symmetry axis O, to the direction of the main electric field on the plane perpendicular to the emission direction at the connection portion 7a of the optical wave emitted from the connection portion 7a to the outside (polarization-maintaining optical fiber 6a) and the direction of the main electric field on the plane perpendicular to the emission direction at the connection portion 7d of the optical wave emitted from the connection portion 7d to the outside (polarization-maintaining optical fiber 6d) are substantially orthogonal to each other.

Here, in the case where the number of transmitting/receiving units provided in one optical transmission device is even number (2N), it is only necessary that the virtual symmetry axis O extending in the direction perpendicular to the first direction A is provided between the connection portion of the Nth transmitting/receiving unit (which is counted in order from the top of the row of the connection portions of the transmitting/receiving units arranged parallel to each other) and the connection portion of the N+1th transmitting/receiving unit.

On the other hand, in the case where the number of transmitting/receiving units provided in one optical transmission device is odd number (2N+1), it is only necessary that the virtual symmetry axis O is provided so as to extend in the direction perpendicular to the first direction A above the connection portion of the N+1 th transmitting/receiving unit (which is counted in order from the top of the row of the connection portions of the transmitting/receiving units arranged parallel to each other).

Note that, in one or more embodiments, the term "substantially orthogonal" means the range where the optical transmission devices 1a and 1b functions normally as TE mode or TM mode when an optical wave is transmitted to the inside of the optical transmission devices.

That is, the term "substantially orthogonal" is not the conceptional term strictly representing 90 degrees, and the meaning of this term may be an angle of, for example, −10 degrees to +10 degrees.

Additionally, in one or more embodiments, "positions symmetrical to the virtual symmetry axis O" means that the positions are located in the same order in the case of counting in order from the virtual symmetry axis O, and it is not necessary that the distances from the virtual symmetry axis O are the same as each other.

Particularly, as shown in FIG. 1, the transmitting/receiving unit 8a is connected to the transmitting/receiving unit 8e with the polarization-maintaining optical fiber 6a.

By means of this structure, the optical wave having TE mode emitted from the optical transmitter 3a passes through the polarization-maintaining optical fiber 6a and is launched into the optical receiver 4e.

Moreover, the optical wave having TM mode emitted from the optical transmitter 3e passes through the polarization-maintaining optical fiber 6a and is launched into the optical receiver 4a.

Similarly, regarding the transmitting/receiving units 8b and 8f, the transmitting/receiving unit 8b is connected to the transmitting/receiving unit 8f with the polarization-maintaining optical fiber 6b interposed therebetween.

By means of this structure, the optical wave having TM mode emitted from the optical transmitter 3b passes through the polarization-maintaining optical fiber 6b and is launched into the optical receiver 4f.

In addition, the optical wave having TE mode emitted from the optical transmitter 3f passes through the polarization-maintaining optical fiber 6b and is launched into the optical receiver 4b.

Regarding the transmitting/receiving units 8c and 8g, the transmitting and receiving of an optical signal are carried out by the same configuration as that of the transmitting/receiving units 8a and 8e. Regarding the transmitting/receiving units 8d and 8h, the transmitting and receiving of an optical signal are carried out by the same configuration as that of the transmitting/receiving units 8b and 8f.

In other cases, the arrangement of the transmitting/receiving units is not limited to an example shown in FIG. 1, and another arrangement may be adopted as long as the direction opposite, with respect to the virtual symmetry axis O, to the direction of the main electric field on the plane perpendicular to the emission direction at this connection portion of the optical wave emitted to the outside from one of the connection portions arranged at the positions symmetrical to each other with respect to the virtual symmetry axis O extending perpendicularly to the first direction A in one optical transmission device and the direction of the main electric field on the plane perpendicular to the emission direction at this connection portion of the optical wave emitted from the other of the connection portions to the outside are substantially orthogonal to each other.

For example, when seen in a plan view of FIG. 1, the connection portions of the transmitting/receiving units may be arranged in order from the top to 7a, 7c, 7b, and 7d.

However, in order to reduce polarization crosstalk between the optical waves of the cores adjacent to each other propagate through the waveguides of the transmitting/receiving units adjacent to each other in the same direction, in the connection portions of two transmitting/receiving units adjacent to each other as shown in FIG. 1, a configuration may be adopted in which the directions of the main electric fields on the plane perpendicular to the emission directions of the optical waves emitted from the optical transmitters to which the connection portions are connected be substantially orthogonal to each other.

In addition, as shown in FIG. 1, the entire of the transmitting/receiving units are arranged in parallel to the first direction A; however, the invention is not limited to this.

As long as the connection portions are arranged at least in the first direction A in one optical transmission device, optical transmitters, optical receivers, and polarization combiners/splitters do not necessarily have to be arranged in parallel to the first direction A.

As described above, the optical transmission devices 1a and 1b according to one or more embodiments, for example, in the configuration of a pair of the transmitting/receiving units of the transmitting/receiving units 8a to 8d of the optical transmission device 1a, in which the connection portions are arranged at the positions symmetrical to each other with respect to the virtual symmetry axis O, the direction opposite, with respect to the virtual symmetry axis O, to the direction of the main electric field on the plane perpendicular to the emission direction at this connection portion the optical wave emitted from one of the connection portions to the outside and the direction of the main electric field on the plane perpendicular to the emission direction at this connection portion of the optical wave emitted from the other of the connection portions to the outside are substantially orthogonal to each other.

According to this, the same unit can be used as each of the transmitting/receiving units 8a and 8h, the transmitting/receiving units 8b and 8g, the transmitting/receiving units 8c and 8f, and the transmitting/receiving units 8d and 8e.

Consequently, a pair of connection portions are connected to each other via the polarization-maintaining optical fiber, that is, the connection portion of the optical transmission device 1a and the connection portion of the optical transmission device 1b having the same configuration as that of at least a plurality of transmitting/receiving units of the optical transmission device 1b are connected to each other via the polarization-maintaining optical fiber. Therefore, when the bidirectional optical transmission device 10 is configured by the connection portions, it is possible to achieve a common configuration as the configurations of at least the plurality of the transmitting/receiving units in the pair of the optical transmission devices 1a and 1b while reducing polarization crosstalk between the optical waves in a single core which bidirectionally propagate the inside of the polarization-maintaining optical fiber.

Furthermore, the bidirectional optical transmission device 10 according to one or more embodiments is configured so that a pair of connection portions are connected, that is, the connection portion of the optical transmission device 1a and the connection portion of the optical transmission device 1b having the same configuration as that of at least a plurality of transmitting/receiving units of the optical transmission device 1b are connected to each other via the polarization-maintaining optical fiber.

Therefore, in the plurality of transmitting/receiving units which are arranged at the positions symmetrical to each other with respect to the virtual symmetry axis O extending perpendicularly to the first direction A, the direction opposite, with respect to the virtual symmetry axis O, to the direction of the main electric field on the plane perpendicular to the emission direction at this connection portion of the optical wave emitted to the outside from one of the connection portions and the direction of the main electric field on the plane perpendicular to the emission direction at this connection portion of the optical wave emitted from the other of the connection portions to the outside are substantially orthogonal to each other.

As a result, it is possible to achieve a common configuration as the configurations of at least the plurality of the transmitting/receiving units in the pair of the optical transmission devices while reducing polarization crosstalk between the optical waves in a single core which bidirectionally propagate through the inside of the polarization-maintaining optical fiber.

Because of this, it is possible to achieve the optical transmission devices 1a and 1b or the bidirectional optical transmission device 10 with a relatively simple configuration, reduce the cost of manufacturing, and improve ease of maintenance.

Additionally, in the case of using the same substrate as the substrate 2a and 2b in one or more embodiments, it is also possible to achieve a common configuration as the configurations of the optical transmission device 1a and the optical transmission device 1b.

In this case, as compared with the case where the same substrate is not used as the substrate 2a and 2b, it is possible to achieve the optical transmission devices 1a and 1b and the bidirectional optical transmission device 10 with a further simplified configuration.

Furthermore, also in this case, it is possible to reduce the cost of manufacturing the optical transmission devices 1a and 1b or the bidirectional optical transmission device 10 and improve ease of maintenance therefor.

Moreover, in the bidirectional optical transmission device 10, since the propagation directions of two modes that propagate through the inside of the polarization-maintaining optical fibers 6a to 6d that connect the pair of the optical transmission devices 1a and 1b are reversed to each other, it is possible to reduce polarization crosstalk in a single core.

Also, since the connection portions 7a to 7h are arranged on the substrate 2a and the substrate 2b at regular intervals, for example, when the optical transmission devices 1a and 1b are connected to each other after bundling the polarization-maintaining optical fibers 6a to 6d, distances between adjacent optical fibers of the polarization-maintaining optical fibers 6a to 6d at both ends of the bundle of the polarization-maintaining optical fibers 6a to 6d can be equal to each other.

Accordingly, both ends of the bundle of the polarization-maintaining optical fibers 6a to 6d can be simply connectable to the optical transmission devices 1a and 1b, it is possible to achieve the optical transmission device 10 with a relatively simple configuration.

Next, another aspect of the invention will be described. The basic configuration described below according to one or more embodiments may be the same as that of the the above-described embodiments.

Identical reference numerals are used for the elements which are identical to those of the above-described embodiments, and the explanations thereof are omitted or simplified here, and only the differences from the above-described embodiments will be described.

One or more embodiments described below are different from the above-described embodiments in that a polarization-maintaining multi-core optical fiber is used therein.

Figure 3:
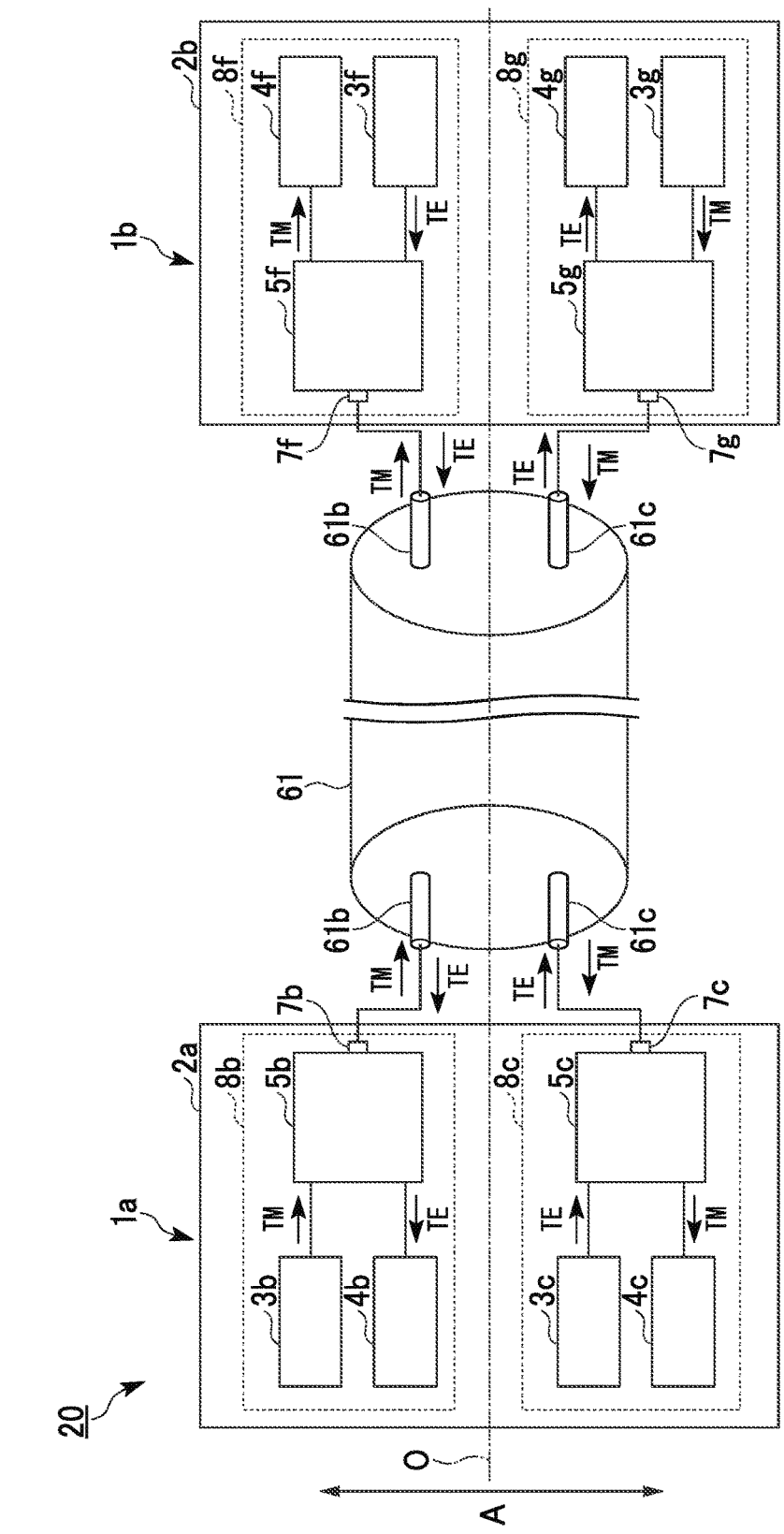
FIG. 3 is a diagram showing a configuration of an optical transmission device according to one or more embodiments.

As shown in FIG. 3, a bidirectional optical transmission device 20 according to one or more embodiments includes a polarization-maintaining multi-core optical fiber 61 having two cores 61b and 61c.

The cores 61b and 61c are adjacent to each other in the polarization-maintaining multi-core optical fiber.

The optical transmission device 1a includes two transmitting/receiving units 8b and 8c which are adjacent to each other on the substrate 2a and arranged in the first direction A.

Additionally, the optical transmission device 1b includes two transmitting/receiving units 8f and 8g which are adjacent to each other on the substrate 2b and arranged in the first direction A.

In other cases, the optical transmission devices 1a and 1b may each include two or more transmitting/receiving units.

As shown in FIG. 3, both ends of the core 61b are connected to the connection portions 7b and 7f of the optical transmission devices 1a and 1b.

Both ends of the core 61c are connected to the connection portions 7c and 7f of the optical transmission devices 1a and 1b.

An optical wave that propagates through the inside of the core 61b toward the optical transmission device 1b becomes TM mode on the substrate 2b, and an optical wave that propagates through the inside of the core toward the optical transmission device 1a becomes TE mode on the substrate 2a.

Furthermore, an optical wave that propagates through the inside of the core 61c toward the optical transmission device 1a becomes TE mode on the substrate 2a, and an optical wave that propagates through the inside of the core toward the optical transmission device 1b becomes TM mode on the substrate 2b.

As stated above, in the cores 61b and 61c adjacent to each other in the polarization-maintaining multi-core optical fiber 61, the directions of the main electric fields on the plane perpendicular to the waveguide directions of the optical waves that propagate in the same direction are substantially orthogonal to each other.

According to the bidirectional optical transmission device 20 of one or more embodiments, since the directions of the main electric fields on the plane perpendicular to the emission directions of the optical waves emitted from the optical transmitters 3b and 3c adjacent to each other are substantially orthogonal to each other and the directions of the main electric fields on the plane perpendicular to the emission directions of the optical waves emitted from the optical receivers 4*b* and 4*c* adjacent to each other are substantially orthogonal to each other, the directions of the main electric fields on the plane perpendicular to the waveguide directions of the optical waves that propagate through the insides of the waveguides of the transmitting/receiving units adjacent to each other and the insides of the cores 61*b* and 61*c* adjacent to the polarization-maintaining optical fiber in the same direction are substantially orthogonal to each other, it is possible to reduce polarization crosstalk between the cores adjacent to each other.

Specifically, in a fiber such as particularly a multi-core fiber in addition to the polarization crosstalk in a single core on the substrate, since the directions of the same polarized wave in cores adjacent to each other are reversed to each other, it is possible to reduce the polarization crosstalk in the case the optical waves propagate in the same direction and is generated between the cores adjacent to each other.

Moreover, in the optical transmission devices 1*a* and 1*b* according to one or more embodiments, as shown in FIG. 3, by adopting the arrangement of the transmitting/receiving units, the same unit can be used as each of the transmitting/receiving units 8*b* and 8*g* and the transmitting/receiving units 8*c* and 8*f*.

Consequently, a pair of connection portions are connected to each other via the polarization-maintaining multi-core optical fiber, that is, the connection portion of the optical transmission device 1*a* and the connection portion of the optical transmission device 1*b* having the same configuration as that of at least a plurality of transmitting/receiving units of the optical transmission device 1*b* are connected to each other via the polarization-maintaining multi-core optical fiber 61. Therefore, when the bidirectional optical transmission device 20 is configured by the connection portions, it is possible to achieve a common configuration as the configurations of at least the plurality of the transmitting/receiving units in the pair of the optical transmission devices 1*a* and 1*b* while reducing polarization crosstalk between the optical waves in the cores adjacent to each other which bidirectionally propagate the inside of the polarization-maintaining optical fiber.

Additionally, in the case of using the same substrate as the substrate 2*a* and 2*b*, it is also possible to achieve a common configuration as the configurations of the optical transmission device 1*a* and the optical transmission device 1*b*.

In this case, as compared with the case where the same substrate is not used as the substrate 2*a* and 2*b*, it is possible to achieve the optical transmission devices 1*a* and 1*b* or the bidirectional optical transmission device 20 with a further simplified configuration.

Furthermore, by connecting the optical transmission devices 1*a* and 1*b* by use of the polarization-maintaining multi-core optical fiber 61, connection between the optical transmission devices by use of a plurality of polarization-maintaining optical fibers is not necessary, it is possible to achieve the bidirectional optical transmission device 20 with a relatively simple configuration.

Moreover, the polarization-maintaining multi-core optical fiber 61 includes, for example, N cores (where N is an integer of 2 or greater) in one optical fiber. Therefore, by use of the polarization-maintaining multi-core optical fiber 61, it is possible to achieve transmission having the same capacity by one optical fiber as compared with an optical cable including N optical fibers bundled together therein.

For this reason, it is possible to reduce the cost of alignment of the cores in the optical fibers.

In addition, since it is possible to achieve an optical cable having a further small-diameter, it is easy to bend an optical cable, it is possible to conserve the space to be used to connect wirings, and therefore it is possible to improve handleability of the optical cable.

In FIG. 3, the number of cores of the polarization-maintaining multi-core optical fiber 61 is two, however, a polarization-maintaining multi-core optical fiber having three or more cores may be used which will be described below.

Figure 4:
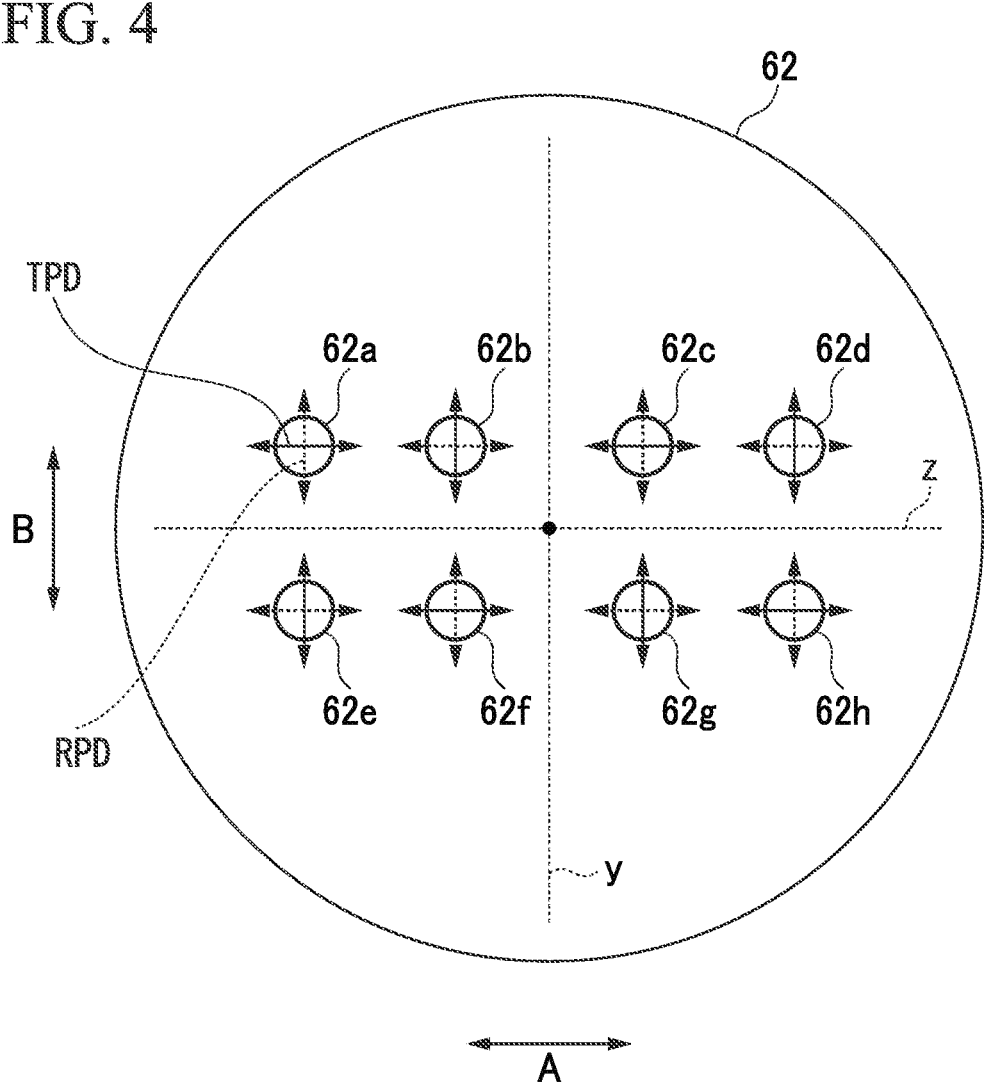
FIG. 4 is an explanatory diagram showing a modified example of an optical transmission device shown in FIG. 3 and is a cross-sectional view showing a connection portion between a polarization-maintaining optical fiber an optical transmission device.

FIG. 4 is a diagram showing a connection face of a polarization-maintaining multi-core optical fiber 62 which is connected to the connection portion of the optical transmission device 1*a* and has eight cores 62*a* to 62*h*, as seen from the optical transmission device 1*a* side.

Transmitting/receiving units which are connected to the cores 62*a* to 62*h* and are not shown in drawings are arranged in the optical transmission devices 1*a* and 1*b*.

The connection portions (connection faces) of the optical transmission devices 1*a* and 1*b* are arranged at the positions corresponding to the cores 62*a* to 62*h*.

The connection portions of the transmitting/receiving units according to one or more embodiments are provided in a row arrangement in not only in the first direction A but also in a second direction B perpendicular to the first direction A.

In accordance with this, the cores 62*a* to 62*h* connected to the connection portions of the optical transmission device 1*a* are provided in a row arrangement in the bidirectional directions of the first direction A and the second direction B.

Optical waves bidirectionally propagate through the insides of the cores 62*a* to 62*h*.

In FIG. 4, in the connection portions, the direction of the main electric field on the plane perpendicular to the waveguide direction of the optical wave directed to the inside of the polarization-maintaining multi-core optical fiber 62 (hereinbelow, referred to as a transmitting polarization direction) is represented by an arrow shown by a solid line. The direction of the main electric field on the plane perpendicular to the waveguide direction of the optical wave directed to the optical transmission device 1*a* (hereinbelow, referred to as a receiving polarization direction) is represented by an arrow shown by a broken line.

As shown in FIG. 4, the core 62*a* and the core 62*d* are arranged at the positions symmetrical to each other with respect to the virtual symmetry axis y extending perpendicularly to the first direction A.

Particularly, the transmitting polarization direction of the core 62*a* and the transmitting polarization direction of the core 62*d* are substantially orthogonal to each other.

Similarly, the core 62*b* and the core 62*c* are arranged at the positions symmetrical to each other with respect to the virtual symmetry axis y.

Particularly, the transmitting polarization direction of the core 62*b* and the transmitting polarization direction of the core 62*c* are substantially orthogonal to each other.

Consequently, according to one or more embodiments, the configurations of the transmitting/receiving units which are connected to the above cores 62*a* to 62*h* and form a pair can be the same as each other, it is possible to achieve a common configuration as the configurations of the transmitting/receiving units on a pair of substrates.

In addition, in the case of using the same substrate as the substrate 2*a* and 2*b*, it is also possible to achieve a common configuration as the configurations of the optical transmission devices 1*a* and 1*b*.

In this case, as compared with the case where the same substrate is not used as the substrate 2*a* and 2*b*, it is possible to achieve the optical transmission devices 1a and 1b and the bidirectional optical transmission device 20 with a further simplified configuration.

Furthermore, in FIG. 4, the core 62a and the core 62e are also arranged at the positions symmetrical to each other with respect to the virtual symmetry axis z extending perpendicularly to the second direction B.

Particularly, the transmitting polarization direction of the core 62a and the transmitting polarization direction of the core 62e are substantially orthogonal to each other.

Similarly, the core 62b and the core 62f are arranged at the positions symmetrical to each other with respect to the virtual symmetry axis z.

Particularly, the transmitting polarization direction of the core 62b and the transmitting polarization direction of the core 62f are substantially orthogonal to each other.

Also, regarding the core 62c and 62g, and 62d and 62h, the relationship is established.

Accordingly, it is possible to achieve a common configuration as the configurations of the transmitting/receiving units which are connected to the above cores 62a to 62h and form a pair.

Note that, in FIG. 4, the directions of the main electric fields on the plane perpendicular to the emission directions of the optical waves emitted from the optical transmitters of the transmitting/receiving units which are arranged at the positions symmetrical to each other with respect not only to the virtual symmetry axis y extending perpendicularly to the first direction A but also to the virtual symmetry axis z extending perpendicularly to the second direction B are substantially orthogonal to each other; however, the invention is not limited to this.

In particular, it is only necessary that the directions of the main electric fields on the plane perpendicular to the emission directions of the optical waves emitted from the optical transmitters of the transmitting/receiving units arranged at the positions symmetrical to each other with respect to at least one of the virtual symmetry axis of the virtual symmetry axis y extending perpendicularly to the first direction A and the virtual symmetry axis z extending perpendicularly to the second direction B are substantially orthogonal to each other.

However, by adopting the arrangement of the cores as shown in FIG. 4, it is possible to reduce polarization crosstalk between the optical waves of the cores adjacent to each other which propagate through the waveguides of the transmitting/receiving units adjacent to each other.

That is, as shown in FIG. 4, the core 62a is adjacent to the core 62b in the first direction A.

Furthermore, the transmitting polarization direction of the core 62a and the transmitting polarization direction of the core 62b are substantially orthogonal to each other.

Similarly, the transmitting polarization directions of the other cores arranged adjacent to each other in the first direction A are substantially orthogonal to each other.

For this reason, the directions of the main electric fields on the plane perpendicular to the propagation directions of the optical waves that propagate in the same direction in of the cores arranged adjacent to each other in the first direction A are substantially orthogonal to each other, and therefore it is possible to reduce polarization crosstalk between the cores adjacent to each other.

Moreover, as shown in FIG. 4, the core 62a is adjacent to the core 62e in the second direction B.

Additionally, the transmitting polarization direction of the core 62a and the transmitting polarization direction of the core 62e are substantially orthogonal to each other.

Similarly, the transmitting polarization directions of the other cores arranged adjacent to each other in the second direction B are substantially orthogonal to each other.

For this reason, the directions of the main electric fields on the plane perpendicular to the propagation directions of the optical waves that propagate in the same direction in of the cores arranged adjacent to each other in the second direction B are substantially orthogonal to each other, and therefore it is possible to reduce polarization crosstalk between the cores adjacent to each other.

Also, as shown in FIG. 3, since the transmitting/receiving units are arranged on the substrates 2a and 2b in two directions, a larger number of transmitting/receiving units can be disposed on the substrates 2a and 2b, and it is possible to provide the bidirectional optical transmission device 20 that can achieve a larger amount of communication.

Note that, in FIG. 4, the first direction A and the second direction B linearly extend.

For convenience, in one or more embodiments, the reference letter A means the first direction and the reference letter B means the second direction, it may be considered that the reference letter B is the first direction and the reference letter A is the second direction.

Figure 5A:
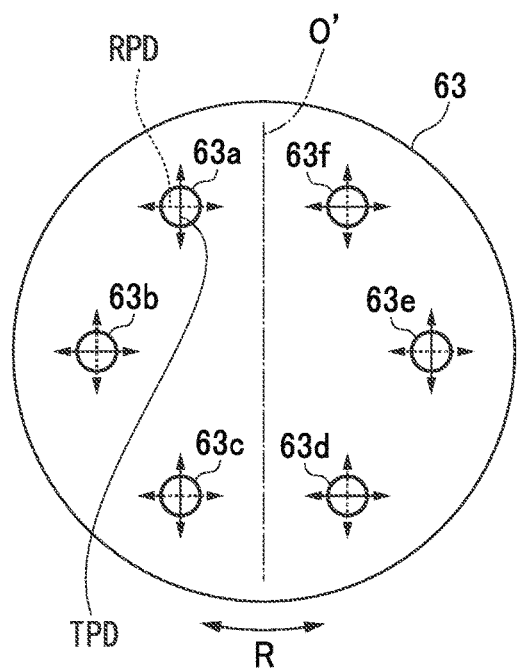
FIG. 5A is an explanatory diagram showing a modified example of an optical transmission device shown in FIG. 3 and is a cross-sectional view showing a connection portion between a polarization-maintaining optical fiber an optical transmission device.
Figure 5A:
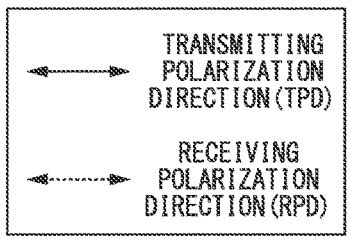
Figure 5B:
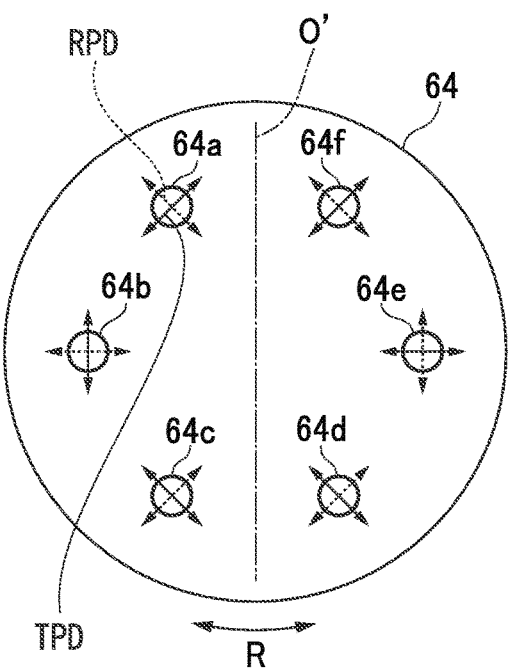
FIG. 5B is an explanatory diagram showing a modified example of an optical transmission device shown in FIG. 3 and is a cross-sectional view showing a connection portion between a polarization-maintaining optical fiber an optical transmission device.
Figure 5B:
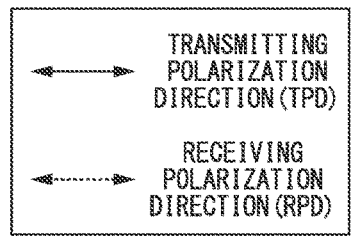

In addition, the cores 62a to 62h are arranged on a line inside the polarization-maintaining multi-core optical fiber 62 in FIG. 4; however, the invention is not limited to this, for example, each core may be circumferentially arranged as shown in FIGS. 5A and 5B.

In FIG. 5A, a polarization-maintaining multi-core optical fiber 63 includes cores 63a to 63f.

The cores 63a to 63f are provided in parallel to each other and circularly arranged in the circumferential direction R (first direction) in the polarization-maintaining multi-core optical fiber 63.

The cores 63a and 63f are arranged at the positions symmetrical to each other with respect to the virtual symmetry axis extending O' extending perpendicularly to the circumferential direction R.

Furthermore, the transmitting polarization direction of the core 63a is the direction parallel to the virtual symmetry axis O', the transmitting polarization direction of the core 63f is the direction perpendicular to the virtual symmetry axis O', and therefore the transmitting polarization directions of the cores 63a and 63f are substantially orthogonal to each other.

Similarly, with respect to the virtual symmetry axis O', the core 63b and the core 63e are arranged at the positions symmetrical to each other, and the core 63c and the core 63d are arranged at the positions symmetrical to each other.

Particularly, regarding the pair of cores arranged at the positions symmetrical to each other, the transmitting polarization directions of the cores are substantially orthogonal to each other.

As mentioned above, by arranging the cores as shown in FIG. 5A, it is possible to achieve a common configuration as the configurations of the transmitting/receiving units connected to both ends of the polarization-maintaining multi-core optical fiber 63.

According to this, the cost of manufacturing the optical transmission devices 1a and 1b can be reduced, and it is possible to prevent ease of maintenance or modification of wiring from being limited.

Furthermore, since the transmitting polarization direction and the receiving polarization direction of the cores are substantially orthogonal to each other, it is possible to reduce polarization crosstalk between the optical waves of the cores adjacent to each other which propagate through the cores.

In addition, in the case of using the same substrate as the substrate 2a and 2b, it is also possible to achieve a common configuration as the configurations of the optical transmission devices 1a and 1b.

Consequently, in this case, as compared with the case where the same substrate is not used as the substrate 2a and 2b, it is possible to achieve the optical transmission devices 1a and 1b or the bidirectional optical transmission device 20 with a further simplified configuration.

Furthermore, it is possible to reduce the cost of manufacturing the optical transmission devices 1a and 1b and improve ease of maintenance therefor.

In FIG. 5B, a polarization-maintaining multi-core optical fiber 64 includes cores 64a to 64f.

The cores 64a to 64f are provided in parallel to each other and circularly arranged in the circumferential direction R (first direction) in the polarization-maintaining multi-core optical fiber 64.

The cores 64a and 64f are arranged at the positions symmetrical to each other with respect to the virtual symmetry axis extending O' (the distance between the cores 64a and 64f are substantially the same as each other) that passes between the cores 64a and 64f and perpendicularly extends in the downward direction of FIG. 5B.

Furthermore, the transmitting polarization direction of the core 64a is the direction inclined at approximately 45 degrees with respect to the virtual symmetry axis O'. The transmitting polarization direction of the core 64f and the transmitting polarization direction of the core 64a are directed in the same direction as each other.

Similarly, with respect to the virtual symmetry axis O', the core 64b and the core 64e are arranged at the positions symmetrical to each other and the core 64c and the core 64d are arranged at the positions symmetrical to each other.

Particularly, regarding the pair of cores arranged at the positions symmetrical to each other, the transmitting polarization directions of the core 64b and the core 64e are substantially orthogonal to each other, and the transmitting polarization directions of the core 64c and the core 64d are directed in the same direction each other.

As described above, in the optical transmission devices 1a and 1b according to one or more embodiments, by arranging the cores as shown in FIG. 5A, it is possible to achieve a common configuration as the configurations of the transmitting/receiving units connected to both ends of the polarization-maintaining multi-core optical fiber 64.

According to this, the cost of manufacturing the optical transmission devices can be reduced, and it is possible to prevent ease of maintenance or modification of wiring from being limited.

Furthermore, since the transmitting polarization direction and the receiving polarization direction of the cores adjacent to each other are substantially orthogonal to each other, it is possible to reduce polarization crosstalk between the optical waves of the cores adjacent to each other which propagate through the cores.

In addition, in the case of using the same substrate as the substrate 2a and 2b, it is also possible to achieve a common device as the optical transmission devices 1a and 1b.

Consequently, in this case, as compared with the case where the same substrate is not used as the substrate 2a and 2b, it is possible to achieve the optical transmission devices 1a and 1b or the bidirectional optical transmission device 20 with a further simplified configuration.

Furthermore, it is possible to reduce the cost of manufacturing the optical transmission devices 1a and 1b and improve ease of maintenance therefor.

As a method of achieving the configuration shown in FIGS. 5A and 5B, which has a connection hole with respect to a polarization-maintaining multi-core fiber in which cores are not arranged in a plurality of rows or not arranged in a row, for example, a method of forming silicon layers with a multi-layered structure and forming a joint having two layers at an end portion thereof or a method of utilizing a grating coupler or the like that transmits light to an upper side of a substrate may be adopted.

Note that, the circumferential direction R is represented as the first direction for convenience in FIGS. 5A and 5B; however, the invention is not limited to this.

For example, it may be assumed that the linear direction parallel to the cores 63a and 63f is the first direction.

Hereinbelow, the case of applying a grating coupler 70 to the transmitting/receiving unit 8b shown in FIG. 3 will be described as an example by use of FIG. 6; however, any transmitting/receiving unit described in one or more embodiments may be applied to the grating coupler.

Figure 6:
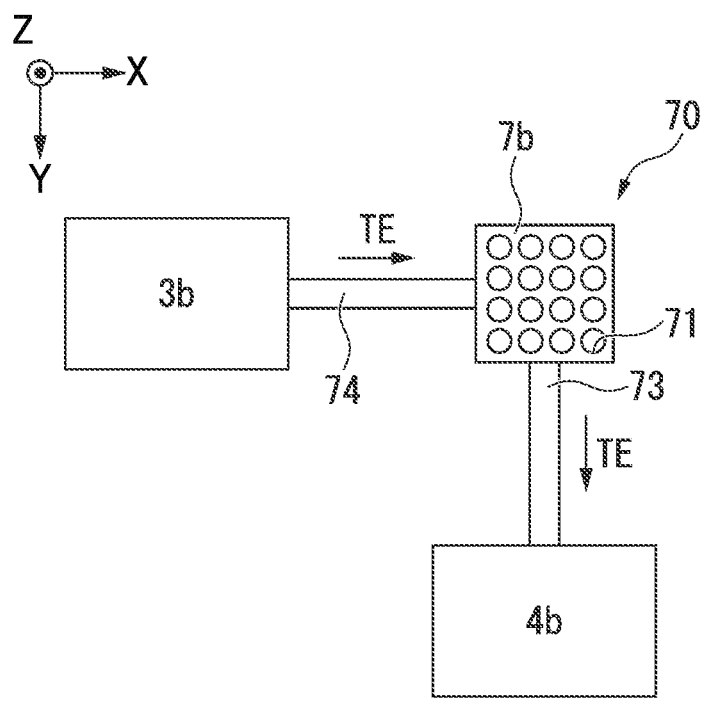
FIG. 6 is a diagram showing a configuration of a grating coupler according to one or more embodiments.

The grating coupler 70 has both a function of the polarization combiner/splitter 5b and a function and a configuration of the connection portion 7b and is disposed on a substrate as shown in FIG. 6.

Therefore, in the case of using the grating coupler 70 in one or more embodiments, the polarization combiner/splitter 5b and the connection portion 7b are replaced with each other and are used.

The grating coupler 70 is configured by spreading silicon used as a core of a waveguide in a planar shape and by changing a height or a material of a structure change portion 71 so that a refractive index varies with respect to a light traveling direction therein.

Due to this refractive index change, light is emitted toward the outside of the plane parallel to the substrate or is launched thereinto.

Here, for convenience, circular parts shown in FIG. 6 are referred to as a structure change portion 71.

Note that, the core of the waveguide means a core of the waveguide which is generally constituted of a core and a clad.

Moreover, in order to obtain a function of polarized-wave combining and splitting, the aforementioned refractive index change is provided in the plane parallel to the substrate so as to have a grid pattern, and two waveguides are connected thereto in the directions which are different from each other and perpendicular to each other. According to this, lights launched into the grating coupler 70 from the waveguides are superimposed on the emission (incidence) plane and become the light having the directions of the main electric fields which are perpendicular to each other when light emission, and the lights can be coupled to the optical fiber that is located outside the substrate surface, for example, at the upper side.

In addition, since the grating coupler 70 is contradictory, in the optical coupling phenomenon in the above-mentioned optical fiber, the lights propagating the waveguides and on the emission (incidence) plane correspond to the directions of the main electric fields on a one-to-one basis.

That is, if light launched into the grating coupler 70 from the outside of the plane parallel to the substrate has a main electric field in "a certain" direction on a plane perpendicular to the incident direction of the light and is coupled to one of waveguides via the grating coupler 70, the light that progresses in the reverse direction through the same waveguide as that of the above waveguide and is to be emitted through a grating coupler has the main electric field in the direction that is the same as the aforementioned "a certain polarized wave" on the emission face thereof and on the plane perpendicular to the emission direction thereof.

Here, since the emission direction and the incident direction are reverse directions to each other in a space, the surface perpendicular to the direction represents the same surface.

Additionally, as an example of the aforementioned shape having a grid pattern, as shown in FIG. 6, the members from which silicon is removed may be used as the circular parts of the structure change portion 71, and the height thereof may be changed.

In other cases, the kinds of grating shapes are not limited to a grid pattern as mentioned above.

Moreover, of the end portions of the two waveguides to which the aforementioned two waveguides and the grating coupler 70 are not connected, one waveguide 74 is connected to the optical transmitter 3b, and the other waveguide 73 is connected to the optical receiver 4b.

Furthermore, one grating coupler 70 connected to the two the waveguides 74 and 73 is coupled to one of the cores of the polarization-maintaining multi-core optical fiber 61 arranged outside the plane parallel to the substrate 2a.

Consequently, the grating coupler 70 has a function of causing light to be directed to the upward side of the substrate and causing the light to be launched into the polarization-maintaining multi-core optical fiber 61.

In addition, the surface (connection portions 7b) of the grating coupler 70 is coupled to the core of the polarization-maintaining multi-core optical fiber 61 in the above-description; however, the surface (connection portions 7b) of the grating coupler 70 may be coupled to a core of a polarization-maintaining optical fiber.

In the case of using the grating coupler 70, for example, one or more embodiments of light incidence and light emission are as follows.

In particular, the optical wave (TE mode) that is emitted from the optical transmitter 3b of the optical transmission device 1a, is launched into the waveguide 74 shown in FIG. 6, and has an optical wave mode having a main electric field on a plane in ±Y-direction propagates through the inside of the waveguide 74 in +X-direction shown in FIG. 6, and is launched into the grating coupler 70.

Here, the optical wave launched into the grating coupler 70 is emitted toward the outside of the plane parallel to the substrate by grating, and the optical wave is coupled to the polarization-maintaining multi-core optical fiber 61.

Thereafter, the optical wave propagates through the polarization-maintaining multi-core optical fiber 61 until reaches the optical receiver 4f of the optical transmission device 1b which is one of the optical transmission devices.

Furthermore, in this case, the optical wave emitted from the optical transmitter 3f of the optical transmission device 1b is launched into the grating coupler 70 through the polarization-maintaining multi-core optical fiber 61.

Here, the optical wave launched into the grating coupler 70 becomes light (TE mode) having a main electric field on a plane in ±X-direction and is coupled to the waveguide 73 connected to the optical receiver 4b shown in FIG. 6, propagates through the inside of the waveguide 73 in +Y-direction, and thereafter propagates through this until reaches the optical receiver 4b of the optical transmission device 1a.

As described above, in the case of using the grating coupler 70, a pair of the connection portions 7b arranged at positions symmetrical to each other with respect to the virtual symmetry axis O is configured so that the directions of the main electric fields on planes of the emitted light and the incident light on a plane perpendicular to the traveling directions of the emitted light and the incident light are substantially orthogonal to each other when light is emitted from or launched into the connection portion 7b toward the outside of the plane parallel to the substrate. One of the waveguides 74 and 73 which is to be coupled to the optical wave depending on the directions of the electric fields is connected to each of the optical transmitter 3b and the optical receiver 4b.

Next, another aspect of the invention will be described. The basic configuration described below according to one or more embodiments may be the same as that of the above-described embodiments.

Identical reference numerals are used for the elements which are identical to those of the above-described embodiments, and the explanations thereof are omitted or simplified here, and the points different from the above-described embodiments will be only described.

A bidirectional optical transmission device 30 according to one or more embodiments described below is different from the above-described embodiments in that the bidirectional optical transmission device 30 includes a polarization rotator.

Figure 7:
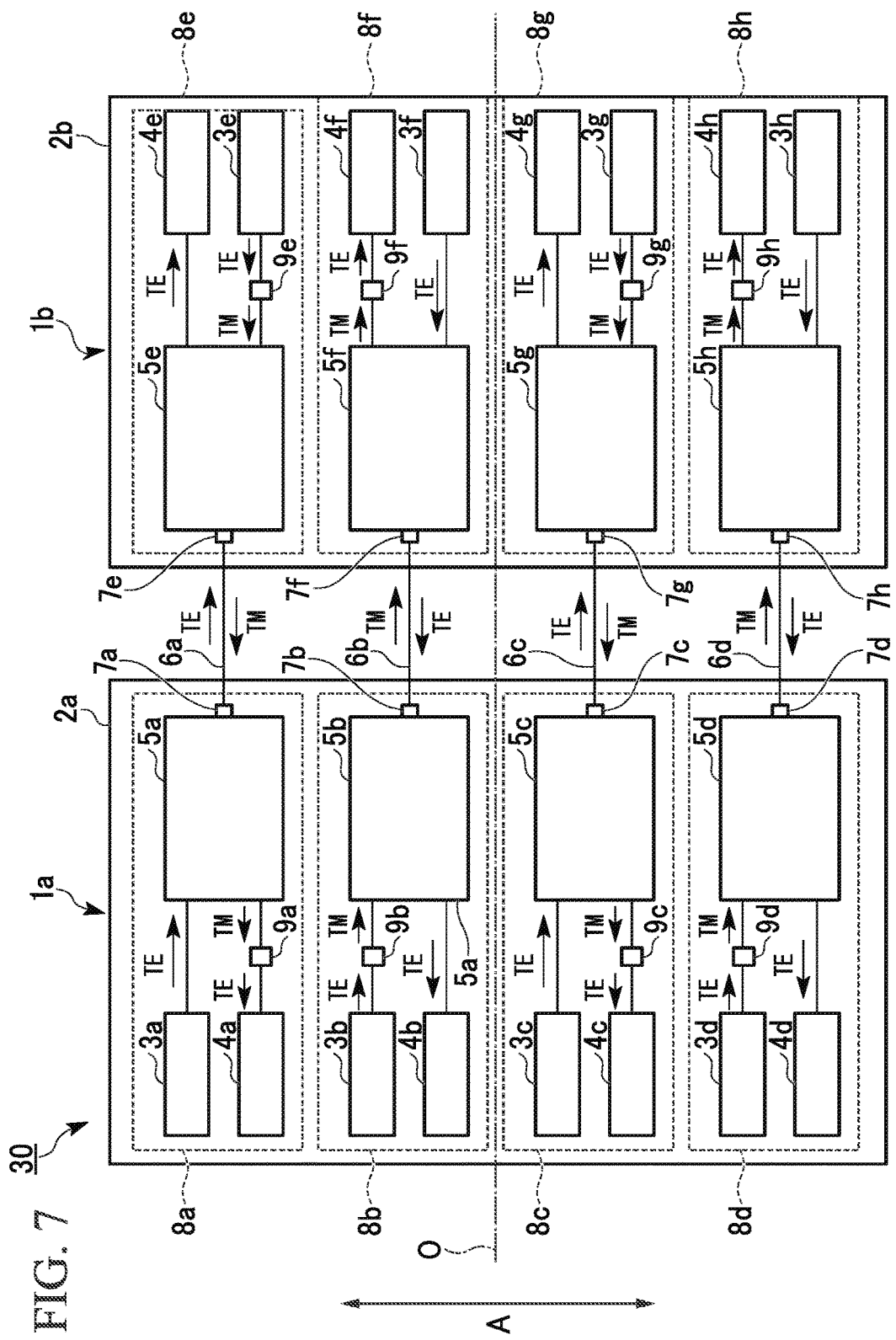
FIG. 7 is a diagram showing a configuration of an optical transmission device according to one or more embodiments.

As shown in FIG. 7, the transmitting/receiving units 8a to 8h include polarization rotators 9a to 9h, respectively.

The polarization rotator 9a is rotatable on an electric field on a plane of the optical wave at 90 degrees.

As disclosed by PCT International Publication No. WO 2014/207949, for example, a polarization conversion element that is configured to have two step height with respect to a silicon waveguide can be used as the polarization rotators 9a to 9h.

As shown in FIG. 7, the polarization rotator 9a is connected to the polarization combiner/splitter 5a and the optical receiver 4a.

The optical wave having TM mode emitted from the polarization combiner/splitter 5a is converted into TE mode by the polarization rotator 9a and is launched into the optical receiver 4a.

Similarly, the other polarization rotators 9c, 9f, and 9h are also connected to the optical receiver and the polarization combiner/splitter of the transmitting/receiving units.

Furthermore, the polarization rotator 9b is connected to the optical transmitter 3b and the polarization combiner/splitter 5b.

The optical wave having TE mode emitted from the optical transmitter 3b is converted into TM mode by the polarization rotator 9b and is launched into the polarization combiner/splitter 5b.

Similarly, the other polarization rotators 9d, 9e, and 9g are also connected to the optical transmitter and the polarization combiner/splitter of the transmitting/receiving units.

Consequently, according to one or more embodiments, the bidirectional optical transmission device 30 is configured so that a pair of connection portions are connected, that is, the connection portion of the optical transmission device 1a and the connection portion of the optical transmission device 1b having the same configuration as that of at least a plurality of transmitting/receiving units of the optical transmission device 1b are connected to each other via the polarization-maintaining optical fiber.

Therefore, for example, in the case of explaining an optical wave that can exist near the optical transmission device 1a, the direction opposite, with respect to the virtual symmetry axis O, to the direction of the main electric field on the plane perpendicular to the emission direction at the connection portion 7b of the optical wave emitted from the connection portion 7b to the outside (polarization-maintaining optical fiber 6b) and the direction of the main electric field on the plane perpendicular to the emission direction at the connection portion 7c of the optical wave emitted from the connection portion 7c to the outside (polarization-maintaining optical fiber 6c) are substantially orthogonal to each other.

Furthermore, the direction opposite, with respect to the virtual symmetry axis O, to the direction of the main electric field on the plane perpendicular to the emission direction at the connection portion 7a of the optical wave emitted from the connection portion 7a to the outside (polarization-maintaining optical fiber 6a) and the direction of the main electric field on the plane perpendicular to the emission direction at the connection portion 7d of the optical wave emitted from the connection portion 7d to the outside (polarization-maintaining optical fiber 6d) are substantially orthogonal to each other.

Therefore, in the plurality of transmitting/receiving units which are arranged at the positions symmetrical to each other with respect to the virtual symmetry axis O extending perpendicularly to the first direction A, the direction opposite, with respect to the virtual symmetry axis O, to the direction of the main electric field on the plane perpendicular to the emission direction at this connection portion of the optical wave emitted to the outside from one of the connection portions and the direction of the main electric field on the plane perpendicular to the emission direction at this connection portion of the optical wave emitted from the other of the connection portions to the outside are substantially orthogonal to each other.

As a result, it is possible to achieve a common configuration as the configurations of at least the plurality of the transmitting/receiving units in the pair of the optical transmission devices while reducing polarization crosstalk between the optical waves in the cores adjacent to each other which bidirectionally propagate the inside of the polarization-maintaining optical fiber.

According to this, the cost of manufacturing the bidirectional optical transmission device 30 can be reduced, and it is possible to prevent ease of maintenance or modification of wiring from being limited.

In addition, in the case of using the same substrate as the substrate 2a and 2b, it is also possible to achieve a common configuration as the configurations of the optical transmission devices 1a and 1b.

Consequently, in this case, as compared with the case where the same substrate is not used as the substrate 2a and 2b, it is possible to achieve the bidirectional optical transmission device 30 with a further simplified configuration.

Furthermore, it is possible to reduce the cost of manufacturing the optical transmission devices 1a and 1b and improve ease of maintenance therefor.

In the bidirectional optical transmission device 30 according to one or more embodiments, for example, the mode of an optical wave launched into the optical receiver 4a or the like can be converted into TE mode from TM mode.

In the case where TE mode is higher than TM mode in the light receiving efficiency of the optical receiver, by use of a polarization rotator as described in one or more embodiments, the optical wave having TE mode with a high degree of light receiving efficiency can be launched into the optical receiver.

Furthermore, by causing the kinds optical receivers 4a to 4h arranged on the optical transmission devices 1a and 1b to be the same as that of the optical receiver that can receive, for example, TE mode, it is possible to reduce the manufacturing cost.

Moreover, in the bidirectional optical transmission device 30 according to one or more embodiments, the mode of the optical wave emitted from, for example, the optical transmitter 3b or the like can be converted into TM mode from TE mode.

As a result, also in the optical transmitter, a modulator having a high degree of efficiency in, for example, TE mode can be formed. Therefore, by designing all modulators or all LDs which are provided at transmission side to use the same polarization in advance, the polarization rotator can only rotate a transmitting/receiving section which is desirable to output an optical wave having TM mode.

Moreover, by causing the kinds of optical receivers arranged on the optical transmission devices 1a and 1b to be the same as each other, it is possible to reduce the manufacturing cost.

Note that, the technical scope of the invention is not limited to the above embodiments, and various modifications may be made without departing from the scope of the invention.

In one or more embodiments, the optical transmission devices 1a and 1b include even number of transmitting/receiving units; however, the optical transmission devices may include odd number of transmitting/receiving units.

In this case, the virtual symmetry axis O orthogonal to the first direction A is located on the center of the transmitting/receiving unit in the first direction A.

Note that, it is only necessary that the number of transmitting/receiving units provided in parallel to each other in one of the optical transmission devices 1a and 1b is two or more, the invention is not limited to the configuration of the aforementioned embodiments.

Additionally, for convenience, the optical transmission devices 1a and 1b are arranged opposite to each other so that the polarization combiners/splitters 5a to 5h face each other; however, the invention is not limited to this configuration.

For example, the optical transmission device 1b may be provided at the place separated from the optical transmission device 1a at approximately several kilo-meters, and the optical transmission devices 1a and 1b may be connected to each other via the polarization-maintaining optical fibers 6a to 6d.

In this case, for example, the polarization-maintaining optical fibers 6a to 6d are combined with each other in a tape-shape, and the configuration such that arrangement of the polarization-maintaining optical fibers 6a to 6d and polarization-maintaining faces do not change at both ends thereof can be achieved.

Consequently, connections between the polarization-maintaining optical fibers 6a to 6d and the optical transmission devices 1a and 1b can be easily carried out, and it is possible to improve workability therefor.

In one or more embodiments, all transmitting/receiving units include the polarization rotator; however, the invention is not limited to this as long as the configuration is adopted in which, the direction opposite, with respect to the symmetry axis, to the direction of the main electric field on the plane perpendicular to the emission direction at this connection portion of the optical wave emitted to the outside from one of the connection portions in a pair of connection portions arranged at the positions symmetrical to each other in one optical transmission device and the direction of the main electric field on the plane perpendicular to the emission direction at this connection portion of the optical wave emitted from the other of the connection portions to the outside are substantially orthogonal to each other.

For example, a polarization rotator is provided between the polarization combiner/splitter and the optical receiver, and a polarization rotator may not be provided between the polarization combiner/splitter and the optical transmitter.

Furthermore a polarization rotator is provided between the polarization combiner/splitter and the optical transmitter, and a polarization rotator may not be provided between the polarization combiner/splitter and the optical receiver.

In one or more embodiments, the alignment sequence of the connection portions in the first direction coincides with the alignment sequence of transmitting/receiving units except for the connection portions; however, the invention is not limited to this.

As long as the connection portions are arranged so as to be defined by the aforementioned arrangement, the optical transmitters, the optical receivers, the polarization combiners/splitters, the polarization rotators, or the like which are provided in the transmitting/receiving unit may be arranged in the order different from that of the connection portions in the first direction.

Similarly, in FIGS. 4 and 5, the connection portions are two-dimensionally arranged; however, it is not necessary that the transmitting/receiving units except for the connection portions are two-dimensionally arranged in parallel so as to correspond to the connection portions, and they may be one-dimensionally arranged on a substrate.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical transmission device comprising:
    a plurality of transmitting/receiving units provided on a substrate, wherein each of the transmitting/receiving units comprises:
        an optical transmitter that emits an optical wave having a polarization state;
        an optical receiver;
        a polarization combiner/splitter that is connected to the optical transmitter and the optical receiver, and splits and combines the optical wave having a different polarization state; and
        a connection portion that is connected to the polarization combiner/splitter and to one end of a polarization-maintaining optical fiber, wherein
    the connection portions of the plurality of the transmitting/receiving units are arranged on the substrate parallel to each other in a first direction,
    the connection portions which form at least one pair thereof are arranged at positions symmetrical to a virtual symmetry axis extending in a direction perpendicular to the first direction, and wherein
    in the connection portions arranged at the positions symmetrical to each other, a direction opposite, with respect to the virtual symmetry axis, to a direction of a main electric field on a plane perpendicular to an emission direction of an optical wave of the connection portion which is emitted from one of the connection portions to an outside is substantially orthogonal to a direction of a main electric field on a plane perpendicular to an emission direction of an optical wave of the connection portion which is emitted from the other of the connection portions to an outside.

2. The optical transmission device according to claim 1, wherein
    in the connection portions adjacent to each of the other of the connection portions of the plurality of the transmitting/receiving units, a direction opposite, with respect to the virtual symmetry axis, to a direction of a main electric field on a plane perpendicular to an emission direction of an optical wave of the connection portion which is emitted from one of the connection portions to an outside is substantially orthogonal to a direction of a main electric field on a plane perpendicular to an emission direction of an optical wave of the connection portion which is emitted from the other of the connection portions to an outside.

3. The optical transmission device according to claim 1, wherein
    the transmitting/receiving unit further comprise a polarization rotator that is arranged at least in one of:
        between the optical receiver and the polarization combiner/splitter; or
        between the optical transmitter and the polarization combiner/splitter,
        wherein the polarization rotator rotates an electric field at 90 degrees on a plane perpendicular to a propagating direction of an optical wave.

4. The optical transmission device according to claim 1, wherein
    the connection portions adjacent to each other in the plurality of the transmitting/receiving units are arranged on the substrate at equal distances.

5. The optical transmission device according to claim 1, wherein
    the connection portions of the plurality of the transmitting/receiving units are also arranged on the substrate in a second direction perpendicular to the first direction.

6. A bidirectional optical transmission device configured so that the connection portion of the optical transmission device according to claim 1 and the connection portion of an optical transmission device having the same configuration as that of at least a plurality of the transmitting/receiving units of the optical transmission device, which form a pair of connection portions, are connected to each other via the polarization-maintaining optical fiber.

7. The bidirectional optical transmission device according to claim 6, wherein
    the polarization-maintaining optical fiber is a polarization-maintaining multi-core optical fiber having a plurality of cores.

* * * * *